(12) United States Patent
Baek et al.

(10) Patent No.: US 11,395,284 B2
(45) Date of Patent: Jul. 19, 2022

(54) METHOD AND APPARATUS OF INDICATING ALTERNATIVE RESOURCE AT COLLISION OF CONFIGURED GRANTS

(71) Applicant: Samsung Electronics Co., Ltd., Suwon-si (KR)

(72) Inventors: Sangkyu Baek, Suwon-si (KR); Anil Agiwal, Suwon-si (KR); Sangbum Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 16/831,140

(22) Filed: Mar. 26, 2020

(65) Prior Publication Data

US 2020/0314814 A1 Oct. 1, 2020

(30) Foreign Application Priority Data

Mar. 28, 2019 (KR) .................. 10-2019-0036272
Oct. 14, 2019 (KR) .................. 10-2019-0127200

(51) Int. Cl.
*H04W 72/04* (2009.01)
*H04W 72/12* (2009.01)
(Continued)

(52) U.S. Cl.
CPC ......... *H04W 72/042* (2013.01); *H04L 1/1812* (2013.01); *H04W 72/1242* (2013.01); *H04W 72/14* (2013.01)

(58) Field of Classification Search
CPC ............ H04L 1/1812; H04W 72/042; H04W 72/1242; H04W 72/14
See application file for complete search history.

(56) References Cited

U.S. PATENT DOCUMENTS 9,374,200 B2 * 6/2016 Kela .................. H04L 5/0055
9,425,925 B2 * 8/2016 Lee .................... H04L 1/1861
(Continued)

FOREIGN PATENT DOCUMENTS

CA 3028778 A1 * 6/2019 ........... H04B 7/0617
CA 3090559 A1 * 8/2019 ........... H04L 1/1812
(Continued)

OTHER PUBLICATIONS

Vivo, Prioritize UL Grant for URLLC Service, Nov. 12, 2018, 3GPP TSG-RAN WG2 Meeting #104, Tdoc: R2-1816943 (Year: 2018).*
(Continued)

*Primary Examiner* — Eric Nowlin
(74) *Attorney, Agent, or Firm* — Jefferson IP Law, LLP

(57) ABSTRACT

A communication technique and a system for fusing a $5^{th}$ generation (5G) communication system with Internet of things (IoT) technology for supporting a higher data rate after a $4^{th}$ generation (4G) system is provided. The disclosure can be applied to intelligent services (e.g., a smart home, a smart building, a smart city, a smart car or a connected car, healthcare, digital education, retail, security and safety related services, and the like), based on 5G communication technology and IoT related technology. The disclosure provides a method and an apparatus for indicating an alternative resource in the event of a collision of configured grants.

10 Claims, 14 Drawing Sheets

(51) Int. Cl.
*H04L 1/18* (2006.01)
*H04W 72/14* (2009.01)

(56) References Cited

U.S. PATENT DOCUMENTS

| | | | | |
|---|---|---|---|---|
| 10,154,466 | B2* | 12/2018 | Dinan | H04W 72/0406 |
| 10,334,581 | B2* | 6/2019 | Dinan | H04L 5/0091 |
| 10,420,165 | B2* | 9/2019 | Dinan | H04W 52/365 |
| 10,542,536 | B2* | 1/2020 | Dinan | H04W 72/1289 |
| 10,631,258 | B2* | 4/2020 | Dinan | H04W 72/0406 |
| 10,798,701 | B2* | 10/2020 | Dinan | H04L 1/0058 |
| 10,834,749 | B2* | 11/2020 | Kim | H04W 72/0453 |
| 10,834,763 | B2* | 11/2020 | Yi | H04W 74/006 |
| 10,904,904 | B2* | 1/2021 | Liu | H04W 72/1289 |
| 11,071,070 | B2* | 7/2021 | Dinan | H04W 72/0406 |
| 11,122,591 | B2* | 9/2021 | Yang | H04W 72/14 |
| 2003/0161294 | A1* | 8/2003 | Yepez, III | H04L 47/2416 370/352 |
| 2015/0103749 | A1* | 4/2015 | Kela | H04L 1/1835 370/329 |
| 2018/0035459 | A1 | 2/2018 | Islam et al. | |
| 2018/0092051 | A1* | 3/2018 | Dinan | H04W 52/365 |
| 2018/0092071 | A1* | 3/2018 | Dinan | H04W 72/1289 |
| 2018/0110084 | A1* | 4/2018 | Dinan | H04W 52/0216 |
| 2018/0352582 | A1* | 12/2018 | Yi | H04W 72/1257 |
| 2019/0036841 | A1* | 1/2019 | Nolan | H04L 47/821 |
| 2019/0124606 | A1* | 4/2019 | Dinan | H04L 5/001 |
| 2019/0261333 | A1* | 8/2019 | Dinan | H04W 72/1289 |
| 2019/0261406 | A1* | 8/2019 | Kim | H04W 76/27 |
| 2019/0289638 | A1* | 9/2019 | Kung | H04W 28/04 |
| 2020/0008262 | A1* | 1/2020 | Dinan | H04W 52/242 |
| 2020/0053749 | A1* | 2/2020 | Liu | H04W 72/1289 |
| 2020/0077432 | A1 | 3/2020 | Xiong et al. | |
| 2020/0112391 | A1* | 4/2020 | Yang | H04W 72/1242 |
| 2020/0154418 | A1* | 5/2020 | Dinan | H04W 72/042 |
| 2020/0245265 | A1* | 7/2020 | Dinan | H04L 5/001 |
| 2020/0259601 | A1* | 8/2020 | Zhou | H04L 5/0085 |
| 2020/0314814 | A1* | 10/2020 | Baek | H04L 1/1812 |
| 2020/0374914 | A1* | 11/2020 | Kim | H04W 76/27 |
| 2021/0014026 | A1* | 1/2021 | Papasakellariou | H04L 1/1861 |
| 2021/0021385 | A1* | 1/2021 | Chen | H04W 72/14 |
| 2021/0022125 | A1* | 1/2021 | Dinan | H04L 5/0091 |
| 2021/0050901 | A1* | 2/2021 | Chin | H04W 72/14 |
| 2021/0084674 | A1* | 3/2021 | Wei | H04L 1/1874 |
| 2021/0105096 | A1* | 4/2021 | Chin | H04L 69/322 |
| 2021/0144751 | A1* | 5/2021 | Joseph | H04W 72/1242 |
| 2021/0227573 | A1* | 7/2021 | Fröberg | H04W 72/14 |
| 2021/0243795 | A1* | 8/2021 | Kuo | H04W 72/14 |
| 2021/0266953 | A1* | 8/2021 | Pelletier | H04W 72/1289 |
| 2022/0007385 | A1* | 1/2022 | Dudda | H04W 72/14 |

FOREIGN PATENT DOCUMENTS

| | | | | |
|---|---|---|---|---|
| CN | 110278616 | A | * 9/2019 | H04L 1/1812 |
| CN | 113169845 | A | * 7/2021 | H04L 1/1819 |
| EP | 3751773 | A1 | * 12/2020 | H04L 1/1812 |
| KR | 20200109857 | A | * 3/2019 | |
| KR | 20210047940 | A | * 9/2019 | |
| WO | 2018/231971 | A1 | 12/2018 | |
| WO | WO-2019216817 | A1 | * 11/2019 | H04W 72/1242 |
| WO | WO-2020067986 | A1 | * 4/2020 | H04L 1/08 |
| WO | WO-2020076840 | A1 | * 4/2020 | H04L 1/0013 |
| WO | WO-2020197313 | A1 | * 10/2020 | H04L 1/1812 |
| WO | WO-2021064972 | A1 | * 4/2021 | |
| WO | WO-2021064973 | A1 | * 4/2021 | |
| WO | WO-2021098877 | A1 | * 5/2021 | H04L 1/16 |

OTHER PUBLICATIONS

Ericsson, On prioritization between overlapping configured and dynamic grants, Nov. 12, 2018, 3GPP TSG-RAN WG2 Meeting #104, Tdoc: R2-1817178 (Year: 2018).*
Huawei et al., Collision between Configured and Dynamic grants, Nov. 12, 2018, 3GPP TSG-RAN WG2 Meeting #104, Tdoc: R2-1817507 (Year: 2018).*
Ericsson, Coexistence Between Configured and Dynamically Scheduled UL Grants, Nov. 12, 2018, 3GPP TSG-RAN WG2 Meeting #104, Tdoc: R2-1817964 (Year: 2018).*
Qualcomm Inc., Prioritization between overlapping dynamic and configured grants, Nov. 12, 2018, 3GPP TSG-RAN WG2 Meeting #104, Tdoc: R2-1818285 (Year: 2018).*
Vivo et al., Clarification on dynamic scheduling override configured downlink assignment, Nov. 12, 2018, 3GPP TSG-RAN WG2 Meeting #104, Tdoc: R2-1818537 (Year: 2018).*
ZTE et al., Consideration on HARQ Conflict Between Configured Grant and Dynamic Grant, Feb. 25, 2018, 3GPP TSG-RAN WG2 Meeting #105, Tdoc: R2-1900580 (Year: 2018).*
Vivo, Prioritization between Overlapping Configured Grants, Feb. 25, 2018, 3GPP TSG-RAN WG2 Meeting #105, Tdoc: R2-1900842 (Year: 2018).*
Institute for Information Industry (III), MAC-PHY interaction for overlapping UL grants, Feb. 25, 2018, 3GPP TSG-RAN WG2 Meeting #105, Tdoc: R2-1900847 (Year: 2018).*
ASUSTek, Intra UE prioritization for UL grants, Feb. 25, 2018, 3GPP TSG-RAN WG2 Meeting #105, Tdoc: R2-1901039 (Year: 2018).*
Huawei et al., Coexistence between configured grant and dynamic grant in NR-U, Feb. 25, 2018, 3GPP TSG-RAN WG2 Meeting #105, Tdoc: R2-1901335 (Year: 2018).*
Huawei et al., Collision between Configured and Dynamic grants, Feb. 25, 2018, 3GPP TSG-RAN WG2 Meeting #105, Tdoc: R2-1901441 (Year: 2018).*
OPPO, Intra-UE Prioritization between configured and dynamic grant for IIoT, Apr. 8, 2019, 3GPP TSG-RAN WG2 Meeting #105bis, Tdoc: R2-1903224 (Year: 2019).*
Huawei et al., Prioritization between configured and dynamic grants, Apr. 8, 2019, 3GPP TSG-RAN WG2 Meeting #105bis, Tdoc: R2-1903368 (Year: 2019).*
Huawei et al., Prioritization between overlapping configured grants, Apr. 8, 2019, 3GPP TSG-RAN WG2 Meeting #105bis, Tdoc: R2-1903371 (Year: 2019).*
ZTE et al., Consideration on HARQ Conflict Between Configured Grant and Dynamic Grant, Apr. 8, 2019, 3GPP TSG-RAN WG2 Meeting #105bis, Tdoc: R2-1903395 (Year: 2019).*
Vivo, Prioritization between Overlapping Configured Grants, Apr. 8, 2019, 3GPP TSG-RAN WG2 Meeting #105bis, Tdoc: R2-1903589 (Year: 2019).*
Nokia et al., Intra-UE prioritization for Collision Between Uplink Grants, Apr. 8, 2019, 3GPP TSG-RAN WG2 Meeting #105bis, Tdoc: R2-1904072 (Year: 2019).*
Huawei et al., Coexistence between configured grant and dynamic grant in NR-U, Apr. 8, 2019, 3GPP TSG-RAN WG2 Meeting #105bis, Tdoc: R2-1904117 (Year: 2019).*
Ericsson, Coexistence Between Configured and Dynamically Scheduled UL Grants, Apr. 8, 2019, 3GPP TSG-RAN WG2 Meeting #105bis, Tdoc: R2-1904743 (Year: 2019).*
LG Electronics Inc., Discussion on collision issue between uplink grants with the same HARQ PID, Apr. 8, 2019, 3GPP TSG-RAN WG2 Meeting #105bis, Tdoc: R2-1904946 (Year: 2019).*
ITL, Solutions for resource conflicts between multiple configured grants, Apr. 8, 2019, 3GPP TSG-RAN WG2 Meeting #105bis, Tdoc: R2-1905040 (Year: 2019).*
ZTE et al., Consideration on HARQ Conflict Between Configured Grant and Dynamic Grant, May 13, 2019, 3GPP TSG-RAN WG2 Meeting #106, Tdoc: R2-1906122 (Year: 2019).*
ZTE et al., Consideration on the Data in the HARQ Buffer Associated with Dropped Grant, May 13, 2019, 3GPP TSG-RAN WG2 Meeting #106, Tdoc: R2-1906123 (Year: 2019).*
ZTE et al., Consideration on HARQ Conflict Between Configured Grant and Dynamic Grant, Aug. 26, 2019, 3GPP TSG-RAN WG2 Meeting #107, Tdoc: R2-1910399 (Year: 2019).*
Institute for Information Industry (III), Intra-UE prioritization for conflict UL grants, Aug. 26, 2019, 3GPP TSG-RAN WG2 Meeting #107, Tdoc: R2-1911123 (Year: 2019).*

(56) References Cited

OTHER PUBLICATIONS

Huawei et al., Discussion on the colission between NR-U configured and dynamic grant, Aug. 26, 2019, 3GPP TSG-RAN WG2 Meeting #107, Tdoc: R2-1911170 (Year: 2019).*
LG Electronics Inc., Impact of intra-UE prioritization on SR cancellation, Aug. 26, 2019, 3GPP TSG-RAN WG2 Meeting #107, Tdoc: R2-1911207 (Year: 2019).*
Huawei et al., Discussion on HARQ process collision between CG and DG, Aug. 26, 2019, 3GPP TSG-RAN WG2 Meeting #107 , Tdoc: R2-1911209 (Year: 2019).*
NTT DOCOMO, Inc., Report for email discussion [106#53][IIOT] Handling of overlapping PUSCH grant prioritization, Aug. 26, 2019, 3GPP TSG-RAN WG2 Meeting #107, Tdoc: R2-1911472 (Year: 2019).*
China Telecom, Remaining Issues on de-prioritized PUSCH on Configured Grant, Aug. 26, 2019, 3GPP TSG-RAN WG2 Meeting #107, Tdoc: R2-1911495 (Year: 2019).*
Ericsson, Handling of De-prioritized MAC PDUs, Oct. 14, 2019, 3GPP TSG-RAN WG2 #107bis, Tdoc: R2-1912554 (Year: 2019).*
OPPO, Intra-UE prioritization involving configured grant, Oct. 14, 2019, 3GPP TSG-RAN WG2#107bis, Tdoc: R2-1912729 (Year: 2019).*
Interdigital, Intra-UE Prioritization for overlapping PUSCHs, Oct. 14, 2019, 3GPP TSG-RAN WG2 #107bis, Tdoc: R2-1912884 (Year: 2019).*
ZTE et al., Consideration on HARQ Conflict Between Configured Grant and Dynamic Grant, Oct. 14, 2019, 3GPP TSG-RAN WG2#107bis, Tdoc: R2-1913047 (Year: 2019).*
Institute for Information Industry (III), Handling of de-prioritized MAC PDUs, Oct. 14, 2019, 3GPP TSG-RAN WG2 #107bis, Tdoc: R2-1913084 (Year: 2019).*
Nokia et al., Handling of De-prioritized MAC PDUs, Oct. 14, 2019, 3GPP TSG-RAN WG2 #107bis, Tdoc: R2-1913091 (Year: 2019).*
Fujitsu, On PDU overwritten in NR-U configured grant, Oct. 14, 2019, 3GPP TSG-RAN WG2#107bis, Tdoc: R2-1913163 (Year: 2019).*
Huawei et al., Handling of de-prioritized MAC PDU due to intra-UE prioritization, Oct. 14, 2019, 3GPP TSG-RAN WG2#107bis, Tdoc: R2-1913242 (Year: 2019).*
Sony, Handling a deprioritized PDU for uplink Intra-UE prioritization, Oct. 14, 2019, 3GPP TSG-RAN WG2#107bis, Tdoc: R2-1913352 (Year: 2019).*
Qualcomm Incorporated, Views on handling of PDUs and data of deprioritized grants, Oct. 14, 2019, 3GPP TSG-RAN WG2 #107bis, Tdoc: R2-1913641 (Year: 2019).*
CATT, Summary on Deprioritized PDUs, Oct. 14, 2019, 3GPP TSG-RAN WG2#107bis, Tdoc: R2-1913955 (Year: 2019).*
OPPO, Discussions on intra-UE multiplexing scenarios, R1-1902422, 3GPP TSG RAN WG1 Meeting #96, Athens, Greece, Feb. 15, 2019, sections 2-3.5; and figure 4.
Interdigital, Inc., Intra-UE Prioritization/Multiplexing for Scenarios 2-5, R1-1902612, 3GPP TSG RAN WG1 Meeting #96, Athens, Greece, Feb. 16, 2019, sections 2-3.3.
ZTE et al., Consideration on HARQ Conflict Between Configured Grant and Dynamic Grant, R2-1900580, 3GPP TSG-RAN WG2 Meeting #105, Feb. 14, 2019, section 2.
International Search Report dated Jul. 2, 2020, issued in International Application No. PCT/KR2020/004186.
Huawei et al., "Further discussion on transmission of de-prioritized data due to intra-UE prioritization", 3GPP Draft; R2-1906507, 3rd Generation Partnership Project (3GPP), Mobile Competence Centre; 650, Route Des Luciol, vol. RAN WG2, No. Reno, United States; May 13, 2019- May 17, 2019, May 13, 2019, XP051729971.
Huawei et al.,"Issues on coexistence between AUL and SUL", R2-1815325, 3rd Generation Partnership Project (3GPP), Mobile Competence Centre; 650, Route Des Lucioles; F-06921 Sophia-Antipolis Cedex; Franc, vol. RAN WG2, No. Chengdu, China; Oct. 8, 2018-Oct. 12, 2018, Sep. 28, 2018, XP051524677.
Interdigital, "Retransmissions Aspects for UL Data-Data Intra-UE Prioritization", R2-1901460, (R16 NR IIOT SI AI1173 RTX UL PRIO), 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 25, 2019-Mar. 1, 2019, Feb. 15, 2019, XP051602818.
Extended European Search Report dated Nov. 23, 2021, issued in European Patent Application No. 20778115.4.

* cited by examiner

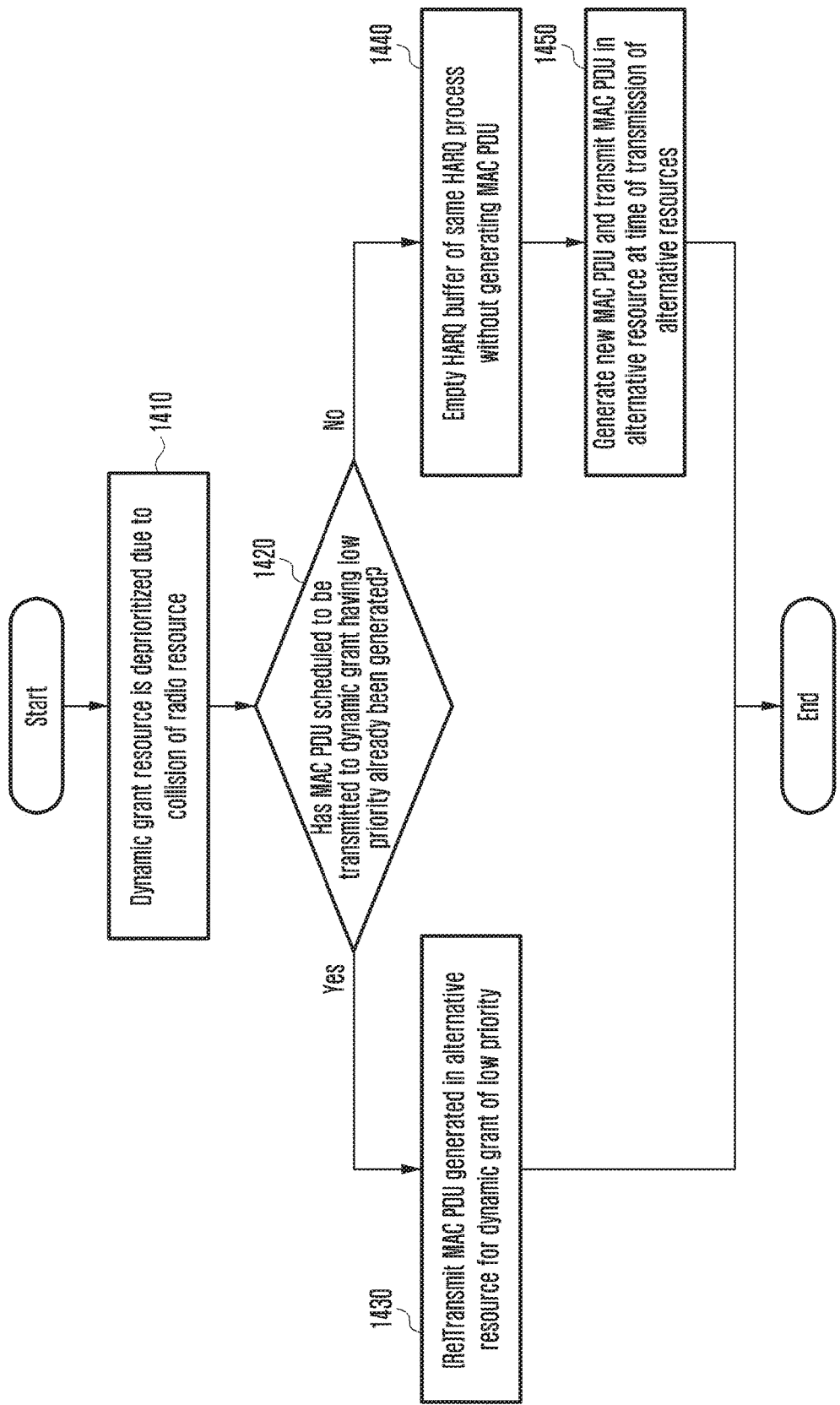

METHOD AND APPARATUS OF INDICATING ALTERNATIVE RESOURCE AT COLLISION OF CONFIGURED GRANTS

CROSS-REFERENCE TO RELATED APPLICATION(S)

This application is based on and claims priority under 35 U.S.C. § 119(a) of a Korean patent application number 10-2019-0036272, filed on Mar. 28, 2019 in the Korean Intellectual Property Office, and of a Korean patent application number 10-2019-0127200, filed on Oct. 14, 2019, in the Korean Intellectual Property Office, the disclosure of each of which is incorporated by reference herein in its entirety.

BACKGROUND

1. Field

The disclosure relates to a method and an apparatus of indicating alternative resource at collision of configured grants.

2. Description of Related Art

To meet the demand for wireless data traffic having increased since deployment of 4th generation (4G) communication systems, efforts have been made to develop an improved $5^{th}$ generation (5G) or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift key (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus of indicating alternative resource at collision of configured grants.

Additional aspects will be set forth in part in the description which follows and, in part, will be apparent from the description, or may be learned by practice of the presented embodiments.

In accordance with an aspect of the disclosure, a method of a terminal in a wireless communication system is provided. The method includes determining whether a resource associated with a first grant and a resource associated with a second grant collide, identifying an alternative resource for a lower priority grant between the first grant and the second grant, in a case of determining that there is collision, determining whether a media access control (MAC) protocol data unit (PDU) corresponding to data associated with the lower priority grant is generated, flushing a buffer, in a case that the MAC PDU is not generated, and transmitting the data to a base station via the identified alternative resource.

In accordance with another aspect of the disclosure, a terminal in a wireless communication system is provided. The terminal includes a transceiver configured to transmit and receive a signal with a base station, and at least one processor configured to determine whether a resource associated with a first grant and a resource associated with a second grant collide, identify an alternative resource for a lower priority grant between the first grant and the second grant, in a case of determining that there is collision, determine whether a MAC PDU corresponding to data associated with the lower priority grant is generated, flush a buffer, in a case that the MAC PDU is not generated, and transmit the data to the base station via the identified alternative resource.

In accordance with another aspect of the disclosure, a control signal processing method in a wireless communication system is provided. The control signal processing method includes receiving a first control signal transmitted from a base station, processing the received first control signal, generating a second control signal based on the processing of the received first control signal, and transmitting the second control signal to the base station.

According to embodiments disclosed in the disclosure, alternative resources can be configured in the case of collision of configured grant.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 14 is a flowchart illustrating alternative resource transmission methods when configured grants overlap according to an embodiment of the disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description of the disclosure, a description of known functions or configurations incorporated herein will be omitted when it may make the subject matter of the disclosure rather unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in $3^{rd}$ generation partnership project long term evolution (3GPP LTE) standards for the convenience of description. However, the disclosure is not limited by these terms and names, and may be applied in the same way to systems that conform other standards. In the disclosure, the term "eNB" may be used interchangeably with the term "gNB" for the convenience of description. For example, a based station described as "eNB" may indicate "gNB".

Figure 1:
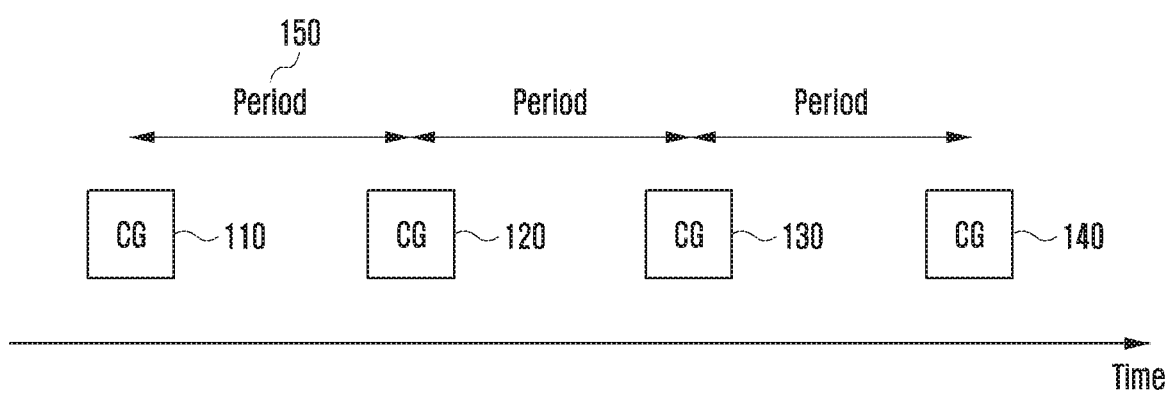
FIG. 1 is a view illustrating an operation of configuring a configured grant according to an embodiment of the disclosure.

FIG. 1 is a view illustrating an operation of configuring a configured grant according to an embodiment of the disclosure.

Referring to FIG. 1, each of the configured grants 110, 120, 130, and 140 is configured to have a certain period 150. A base station may configure each configured grant to a terminal and may configure a period, a location of a radio resource, a size, modulation, a coding rate, and the like. According to an embodiment of the disclosure, such configured grants may be activated immediately upon configuration or may be activated by a separate activation command. It may be assumed that these configured grants have fixed traffic patterns or the configured grants are used for high priority data. In an embodiment of the disclosure, the configured grant may be dedicated to data with a short delay requirement. To this end, the base station may configure whether a specific configured grant can be used for each specific local channel via the radio resource control (RRC) configuration message. According to an embodiment of the disclosure, a plurality of configured grants may be configured for one terminal, and at this time, a period for each configured grant, a location, a size, modulation, coding rate, and the like of a radio resource may be differently configured.

Figure 2:
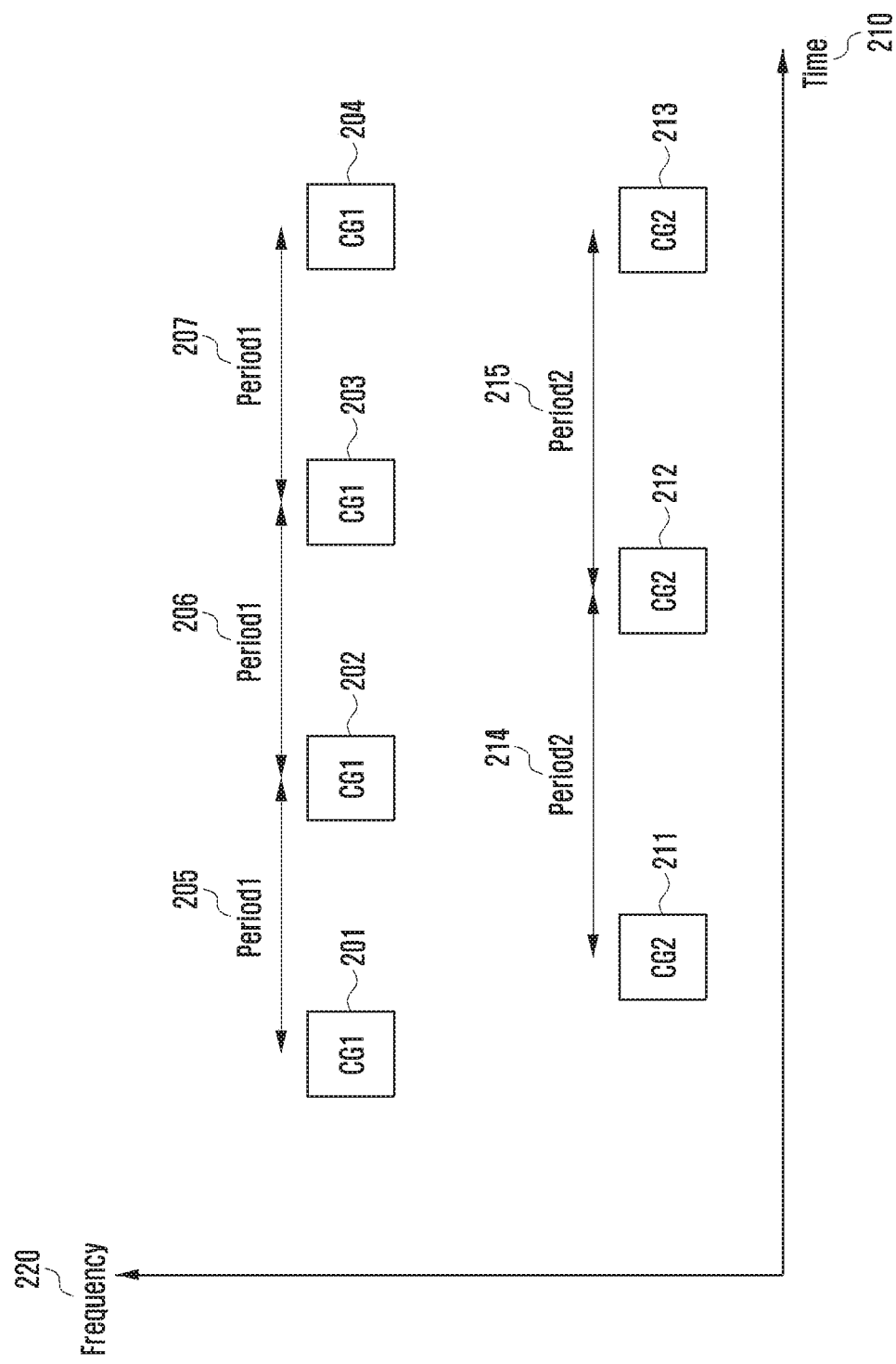
FIG. 2 is a view illustrating a plurality of configured grants being configured according to an embodiment of the disclosure.

FIG. 2 is a view illustrating a plurality of configured grants being configured according to an embodiment of the disclosure.

Referring to FIG. 2, two configured grants, namely first configured grants (CG1s) 201, 202, 203, and 204 and second configured grants (CG2s) 211, 212, 213, and 214, are configured, three or more configured grants may be configured. In this case, different configured grants are configured to mean that the period of the configured grant (e.g., periods 205, 206, and 207 of the first configured grants and periods 214 and 215 of the second configured grants), the location, the size, the modulation, the coding rate and the like of the radio resource are separately configured, and that each configured grant is configured to the configuration of each configured grant. The location of the radio resource may be configured to be divided into a time axis 210 and a frequency axis 220. In this way, a plurality of configured grants may be configured so that each configured grant can process data having different requirements, and at this time, the base station may configure a logical channel that can be transmitted using each configured grant.

Figure 3:
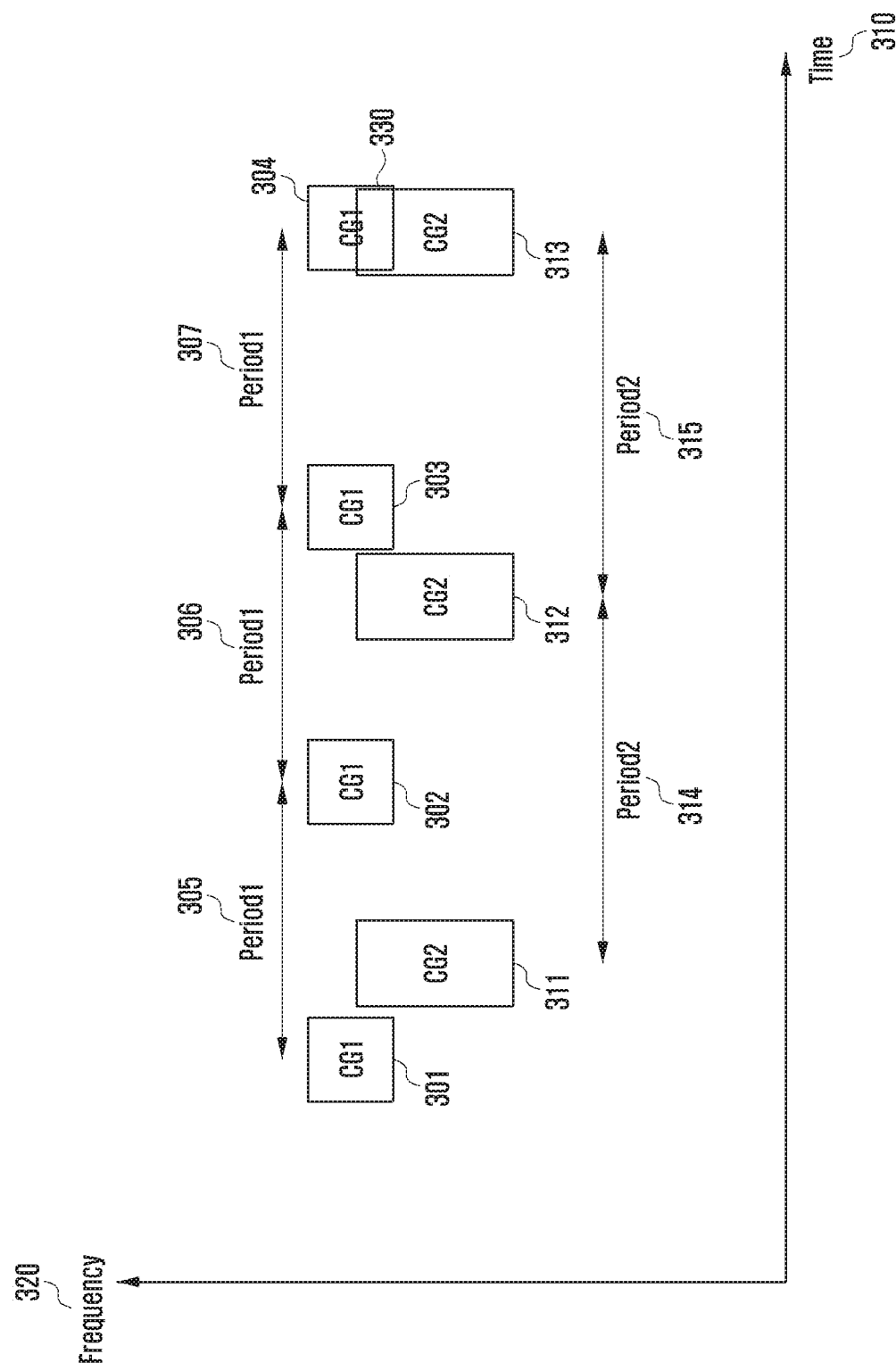
FIG. 3 is a view illustrating a plurality of configured grants overlapping according to an embodiment of the disclosure.

FIG. 3 is a view illustrating a plurality of configured grants overlapping according to an embodiment of the disclosure.

Referring to FIG. 3, two configured grants, first configured grants (CG1s) 301, 302, 303, and 304 and second configured grants (CG2s) 311, 312, 313, and 314, are configured, three or more configured grants may be configured. In this case, different configured grants are configured to mean that the period of the configured grant, the location, the size, the modulation, the coding rate and the like of the radio resource are separately configured, and that each configured grant is configured to the configuration of each configured grant. The location of the radio resource may be configured to be divided into the time axis 310 and the frequency axis 320. In this way, a plurality of configured grants may be configured so that each configured grant can process data having different requirements, and at this time, the base station may configure a logical channel that can be transmitted using each configured grant. In this case, since the periods 305, 306, and 307 of the first configured grants and the periods 314 and 315 of the second configured grants are different, and resources allocated on the time axis or the time and frequency axis overlap, the first configured grants and the second configured grants may overlap (330). In this case, how the terminal should handle the overlapped portions may be a problem.

At this time, the terminal may need to perform transmission by selecting one of the configured grants. This is inevitably necessary to select one configured grant in the case of a terminal having a capability of transmitting only one radio resource. As an example of the method, the transmission corresponding to the first configured grant 304 may be performed and the transmission corresponding to the second configured grant 313 may not be performed according to a predetermined condition. In an embodiment of the disclosure, the resource corresponding to the first configured grant 340 may perform only on a portion 330 where the resource overlap by a predetermined condition, and the transmission corresponding to the second configured grant may normally perform on a portion of the second configured grant 330. Which configured grant to be chosen may be determined by deriving a relative priority configuration in advance for each configured grant, or may be determined according to the type or amount of data the terminal has.

However, when one configured grant is selected and transmitted, since one configured grant is not used, data that needs to be processed with an unused configured grant will not be transmitted in a timely manner, which can degrade its performance. Therefore, it may be important how to handle the data transfer of the configured grant that is not used.

Figure 4:
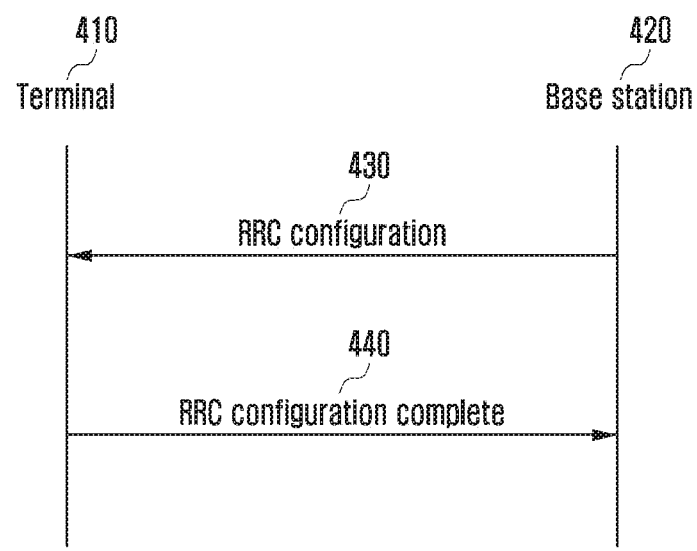
FIG. 4 is a view illustrating an operation of configuring a configured grant according to an embodiment of the disclosure.

FIG. 4 is a view illustrating an operation of configuring a configured grant according to an embodiment of the disclosure.

Referring to FIG. 4, a terminal 410 may receive a configured grant from a base station 420. The configuration may be made by an RRC configuration message 430 sent from the base station to the terminal. The RRC configuration message may include a configured grant configuration information element (IE), and for each configured grant configuration IE, a period of a configured grant, a location, a size, modulation, a coding rate of a radio resource, and whether to use a separate activation message, and the like may be configured. In this case, when receiving a plurality of configured grants configuration IEs, the terminal may have a plurality of configured grants. Accordingly, the configured grant transmission operation described in FIGS. 1, 2, and 3 may be performed. If the terminal successfully receives the RRC configuration 420 message and completes the configuration, the terminal may transmit an RRC configuration completion message 440 to the base station to transmit that the configuration of the terminal is completed.

Figure 5:
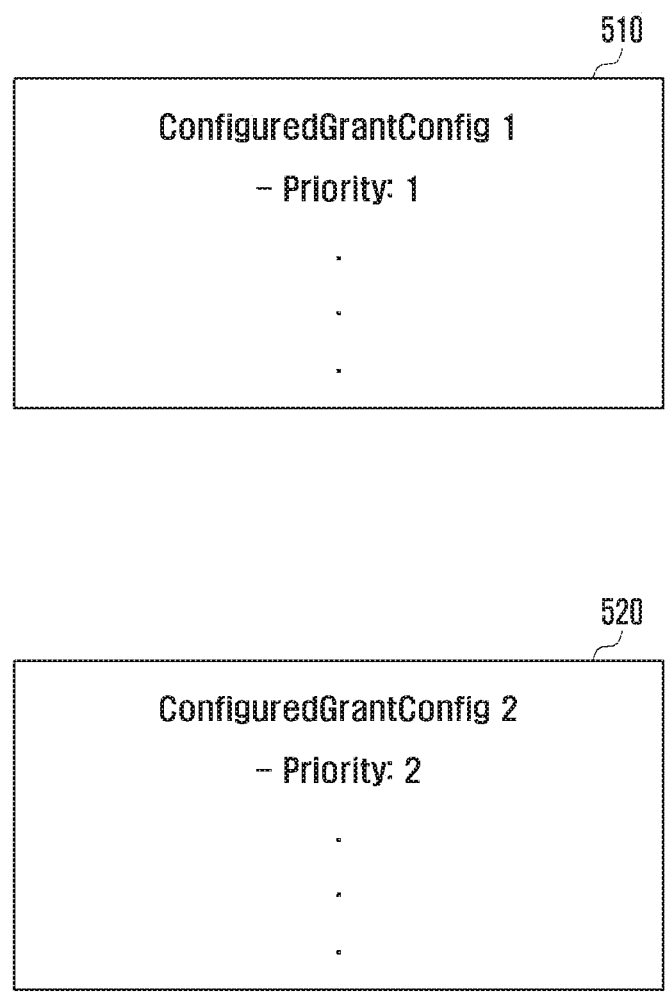
FIG. 5 is a view illustrating a priority configurating method of configured grants according to an embodiment of the disclosure.

FIG. 5 is a view illustrating a priority configurating method of configured grants according to an embodiment of the disclosure.

Referring to FIG. 5, a terminal receives configured grant configuration IEs 510 and 520 from a base station, the configuration may be configured.

In an embodiment of FIG. 5, it is assumed that two configured grants are configured by two configured grant configuration IEs 510 and 520, but the disclosure is applicable to a case where three or more configured grants are configured. The configured grant may be allocated its own priority at the time of configuration. The configured grant corresponding to the first configured grant configuration 510 is assigned a priority value a, and the configured grant corresponding to the second configuration grant configuration 520 is assigned a priority value 2. In general, a lower priority value may be interpreted as having a higher priority, but in an embodiment of the disclosure, a higher priority value may be interpreted as having a higher priority. The priority of the configured grant may be used when the configured grant resource described in FIG. 3 overlaps 330. In the case where the priority overlaps with the resources of the first configured grant and the resources of the second configured grant in operation 330, the terminal may determine which configured grant is to be used, based on the priority of the configured grant. Specifically, if the priority of the first configured grant is higher than the priority of the second configured grant, the first configured grant may be used. In the embodiment of FIG. 5, since the priority value of the first configured grant is low, the priority may be interpreted as high and the first configured grant may be used.

Figure 6:
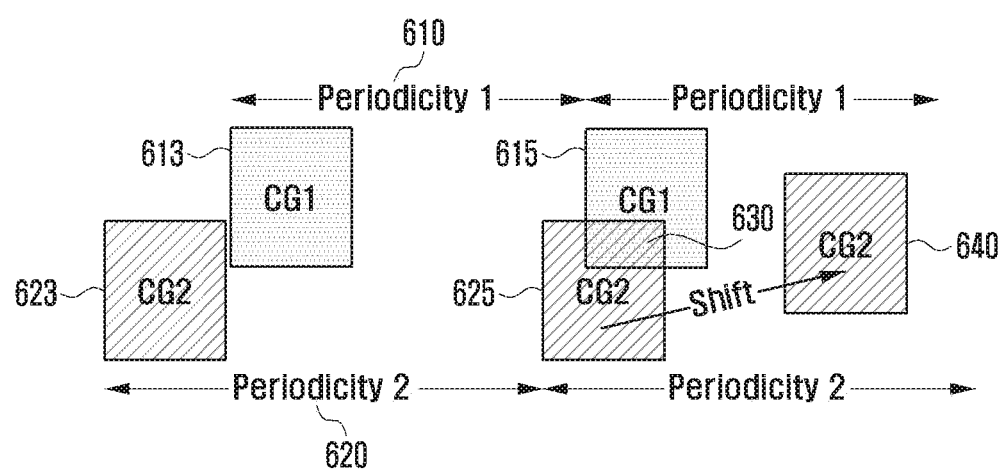
FIG. 6 is a view illustrating a processing method when configured grants overlap according to an embodiment of the disclosure.

FIG. 6 is a view illustrating a processing method when configured grants overlap according to an embodiment of the disclosure.

Referring to FIG. 6, it is assumed that a total of two configured grants, first configured grants 613 and 615 and second configured grants 623 and 625, are configured, but the disclosure is applicable to a case where three or more configured grants are configured. If different configured grants overlap on the time axis or on the frequency axis (630), a terminal having a capability of transmitting only one radio resource should select and transmit one resource of the two configured grants. For example, since periodicity 610 of the first configured grants and periodicity 620 of the second configured grants are different, resources allocated on the time axis or the time and frequency axis overlap. However, if all the resources to be transmitted to the configured grants are important, if one selected configured grant is selected and transmitted, data that needs to be transmitted to the configured grant that cannot be transmitted because it is not selected will inevitably degrade transmission performance. Therefore, if the data to be transmitted to the configured grant is important, it is possible to reduce the degradation of transmission performance by providing an alternative resource 640 of the resource to be transmitted to the configured grant that cannot be transmitted because it is not selected. In the embodiment of FIG. 6, this may be referred to as a shift of resources. In this case, the physical resource 625, which is actually scheduled to be transmitted, and it can be said that the physical resource 625, which was actually scheduled to be transferred, moves to the physical resource 640 elsewhere.

The base station may designate an alternative resource to be used when configured grants overlap with another configured grant on the time axis or time and frequency axes. This can configure to move resources when the resources overlap by configuring RRC, and may configure the size, modulation, coding rate, and rules when the resource moves—for example, information how far from the overlapping resources are on the time and frequency axes when a resource that cannot be used overlaps occurs-, and the like. The configuration may be transferred by the configured grant configurations 510 and 520 and the like. in the RRC configuration message 430. In an embodiment of the disclosure, these alternative resources may be designated by predetermined rules. The rule of the alternative resources may be what resources are used and which resources are not used when the configured grant resources overlap, and where the alternative resources for the configured grant are not used.

Figure 7:
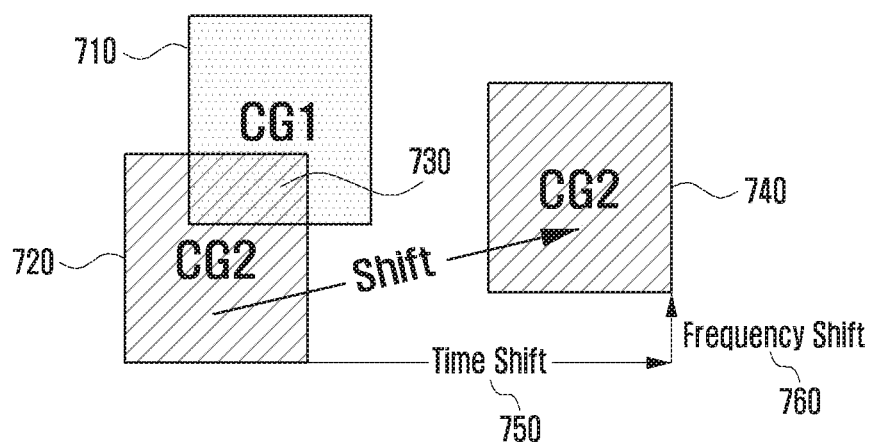
FIG. 7 is a view illustrating an operation of an alternative resource configurating method when configured grants overlap according to an embodiment of the disclosure.

FIG. 7 is a view illustrating an operation of an alternative resource configurating method when configured grants overlap according to an embodiment of the disclosure.

Referring to FIG. 7, it is assumed that a total of two configured grants, a first configured grant 710 and a second configured grant 720, are configured, but the disclosure is also applicable to a case where three or more configured grants are configured. If different configured grants overlap on the time axis or on the time and frequency axes (730), a terminal having a capability of transmitting only one radio resource should select and transmit one resource of the two configured grants. However, if all the resources to be transmitted to the configured grants are important, if one selected configured grant is selected and transmitted, data that needs to be transmitted to the configured grant that cannot be transmitted because it is not selected will inevitably degrade transmission performance. Therefore, if the data to be transmitted to the configured grant is important, it is possible to reduce the degradation of transmission performance by providing an alternative resource 740 of the resource to be transmitted to the configured grant that cannot be transmitted because it is not selected.

To this end, it is possible to designate the location of the alternative resource to move, based on the unused resource (720). In the embodiment of FIG. 7, it is assumed that a first configured grant 710 has a priority and the second configured grant 720, which is disabled, uses an alternative resource. In this case, which configured grant has a priority may be determined in advance, and the configured grant that can be used by the high priority logical channel may take precedence, based on the priority of the logical channels that can use each configured grant. In an embodiment of the disclosure, the priority of the logical channel may be applied regardless of whether the logical channel actually has data to transmit. However, in an embodiment of the disclosure, when using an alternative resource, it is possible to determine which configured grant is used as it is and which configured grant is moved to the alternative resource to be used by the configured grant index value. For example, a configured grant with a small index is preferred. At this time, an alternative resource 740 has been configured for the resource 720 of the second configured grant, which may be possible by configuring a shift value on the time axis (time shift) 750 and a shift value on the frequency axis (frequency shift) 760 from the position 720 of the previously configured resource. In this case, the unit of the shift value 750 on the time axis may be an absolute time, a symbol, a slot, a subframe, and the like. In addition, the unit of the shift value 760 on the frequency axis may be Hertz (Hz), the number of subcarriers, resource block, and the like. In addition, the alternative resource may be the same bandwidth part (BWP) as the existing resource or another bandwidth part (BWP). In order to inform this, the location of the corresponding resource may be informed including a bandwidth part identification (BWP ID), a cell identification (ID), and a secondary cell (SCell) index, and the like.

Figure 8:
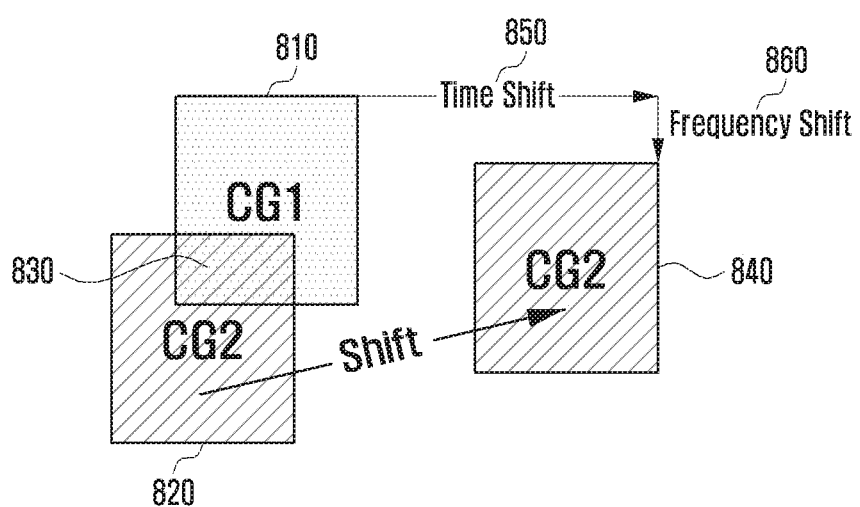
FIG. 8 is a view illustrating an operation of an alternative resource configuration method when the configured grants overlap according to an embodiment of the disclosure.

FIG. 8 is a view illustrating an operation of an alternative resource configuration method when the configured grant overlaps according to an embodiment of the disclosure.

Referring to FIG. 8, it is assumed that a total of two configured grants, a first configured grant 810 and a second configured grant 820, are configured, but the disclosure is also applicable to a case where three or more configured grants are configured. If different configured grants overlap on the time axis or on the time and frequency axes (830), a terminal having a capability of transmitting only one radio resource should select and transmit one resource of the two configured grants. However, if all the resources to be transmitted to the configured grants are important, if one selected configured grant is selected and transmitted, data that needs to be transmitted to the configured grant that cannot be transmitted because it is not selected will inevitably degrade transmission performance. Therefore, if the data to be transmitted to the configured grant is important, it is possible to reduce the degradation of transmission performance by providing an alternative resource 840 of the resource to be transmitted to the configured grant that cannot be transmitted because it is not selected.

To this end, it is possible to designate the location of the alternative resource to move, based on the unused resource (810). In the embodiment of FIG. 8, it is assumed that a first configured grant 810 has a priority and the second configured grant 820, which is disabled, uses an alternative resource. In this case, which configured grant has a priority may be determined in advance, and the configured grant that can be used by the high priority logical channel may take precedence, based on the priority of the logical channel that can use each configured grant. In an embodiment of the disclosure, the priority of the logical channel may be applied regardless of whether the logical channel actually has data to transmit. However, in an embodiment of the disclosure, when using an alternative resource, it is possible to determine which configured grant is used as it is and which configured grant is moved to the alternative resource to be used by the configured grant index value—for example, a configured grant with a small index is preferred. At this time, an alternative resource 840 has been configured for the resource 820 of the second configured grant, which may be possible by configuring a shift value on the time axis (time shift) 850 and a shift value on the frequency axis (frequency shift) 860 from the position 820 of the previously configured resource. In this case, the unit of the shift value 850 on the time axis may be an absolute time, a symbol, a slot, a subframe, and the like. In addition, the unit of the shift value 860 on the frequency axis may be Hertz (Hz), the number of subcarriers, resource block, and the like. In addition, the alternative resource may be the same bandwidth part (BWP) as the existing resource or another BWP. In order to inform this, the location of the corresponding resource may be informed including a BWP ID, a cell ID, and an SCell index, and the like.

Figure 9:
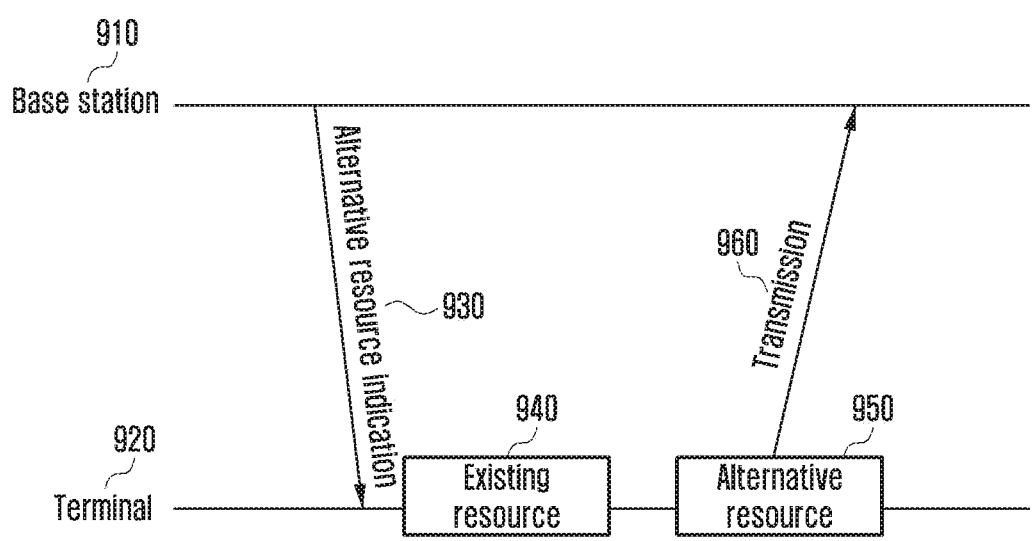
FIG. 9 is a view illustrating a method for indicating an alternative resource according to an embodiment of the disclosure.

FIG. 9 is a view illustrating a method for indicating an alternative resource according to an embodiment of the disclosure. As described with reference to FIGS. 3 and 6, when two or more configured grants overlap on the time axis, or the time axis and the frequency axis, alternative resources for resources not available to the terminal described in FIGS. 6, 7, and 8 may be configured. To this end, a base station 910 may send a message indicating an alternative resource to a terminal 920 (930). The message may include which resource to provide an alternative resource for, or which of the overlapping configured grants to use. In the case of the configured grant that requires the use of the alternative resource, it may also indicate the location of the alternative resource. The location of the alternative resource may indicate the location away from the time axis and the frequency axis relative to the specific configured grant described in FIG. 7 and FIG. 8, and may also indicate the absolute location as a system frame number (SFN), slot number or a symbol number in the transmission resource. It may also include the modulation and coding scheme (MCS) of the alternative resource, the logical channel ID from which the alternative resource is available, and the physical layer priority of the alternative resource. In addition, a new data indicator (NDI) may be configured as a certain value that toggles or does not toggle, indicating that the data is an alternative resource. The alternative resource indication message may be informed in the form of DCI using physical downlink control channel (PDCCH). The terminal receiving the alternative resource indication message 930 may perform transmission by changing the location of the configured grant that cannot be used to change the location of the existing resource 940 to the location 950 of the alternative resource (960).

Figure 10:
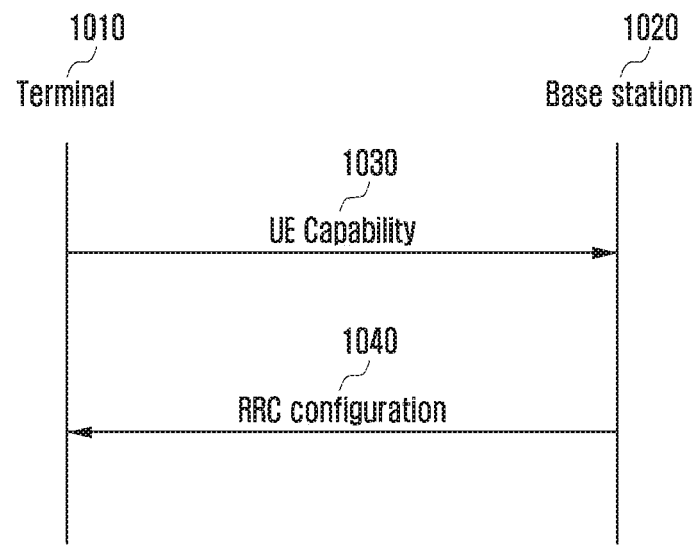
FIG. 10 is a view illustrating an embodiment in which a base station configures simultaneous transmission according to an embodiment of the disclosure.

FIG. 10 is a view illustrating an embodiment in which a base station configures simultaneous transmission according to an embodiment of the disclosure. In some terminals, as described with reference to FIGS. 3 and 6, when two or more configured grants overlap on the time axis, or the time axis and the frequency axis, two configured grants may be simultaneously transmitted. In this case, the terminal may have more radio frequency (RF) chains that can be actually used than the number of RF chains actually configured. In this case, the terminal 1010 should inform the base station 1020 that simultaneous transmission of physical resources overlapping in the terminal is possible. This message may be included in the terminal capability message 1030 and transmitted. Accordingly, the base station can identify a scenario capable of transmission to the terminal. For example, if the terminal is capable of transmitting two physical resources at the same time, the base station may indicate the terminal to transmit the overlapped configured grant. Such a message may be indicated by being included in the RRC configuration message 1040. In this case, the base station may designate a specific cell or a specific BWP to which the terminal simultaneously transmits overlapping configured grant resources. Accordingly, the terminal can determine whether to apply simultaneous transmission for overlapping configured grant resources, transmit using alternative resources described in FIGS. 6, 7, 8 and 9, or use only one of the overlapping resources.

In an embodiment of the disclosure, the base station may configure a condition for simultaneous transmission. For example, if there is data to be sent by a logical channel that is higher than a certain priority, simultaneous transmission may be performed even if the configured grant resources overlap. For example, simultaneous transmission may be allowed for logical channels higher than priority 4 regardless of overlapping configured grant resources. In this case, if the priority of a logical channel that should use the first configured grant is 2, and the priority of a logical channel that should use the second configured grant is 1, all of them are higher than the priority 4, so even if the two configured grants overlap, all data transmission can be performed.

Figure 11:
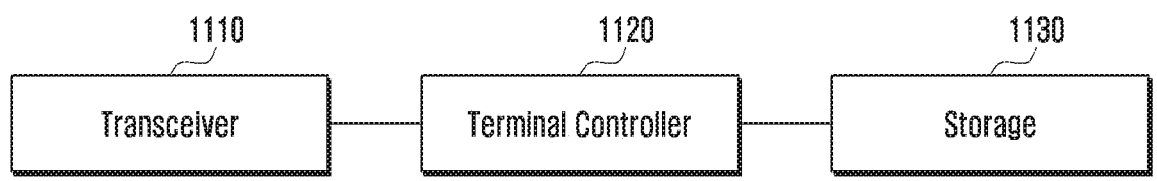
FIG. 11 is a view illustrating a structure of a terminal according to an embodiment of the disclosure.

FIG. 11 is a view illustrating a structure of a terminal according to an embodiment of the disclosure.

Referring to FIG. 11, the terminal may include a transceiver 1110, a controller 1120, and a storage 1130. In the disclosure, the controller may be defined as a circuit or application specific integrated circuit or at least one processor.

The transceiver 1110 may transmit and receive a signal with another network entity. The transceiver 1110 may receive system information from, for example, a base station and may receive a synchronization signal or a reference signal.

The controller 1120 may control the overall operation of the terminal according to the embodiment proposed by the disclosure. For example, the controller 1120 may control a signal flow between blocks to perform an operation according to the flowchart described above.

The storage 1130 may store at least one of information transmitted and received through the transceiver 1110 and information generated through the controller 1120.

Figure 12:
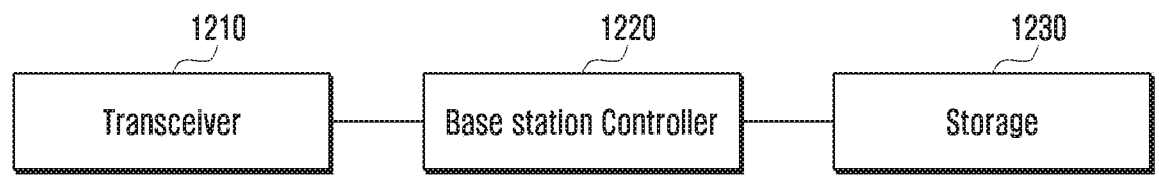
FIG. 12 is a view illustrating a structure of a base station according to an embodiment of the disclosure.

FIG. 12 is a view illustrating a structure of a base station according to an embodiment of the disclosure.

Referring to FIG. 12, the base station may include a transceiver 1210, a controller 1220, and a storage 1230. In the disclosure, the controller 1220 may be defined as a circuit or application specific integrated circuit or at least one processor.

The transceiver 1210 may transmit and receive a signal with another network entity. The transceiver 1210 may transmit system information to, for example, a terminal and may transmit a synchronization signal or a reference signal.

The controller 1220 may control the overall operation of the terminal according to the embodiment proposed by the disclosure. For example, the controller 1220 may control a signal flow between blocks to perform an operation according to the flowchart described above.

The storage 1230 may store at least one of information transmitted and received through the transceiver 1210 and information generated through the controller 1220.

Figure 13:
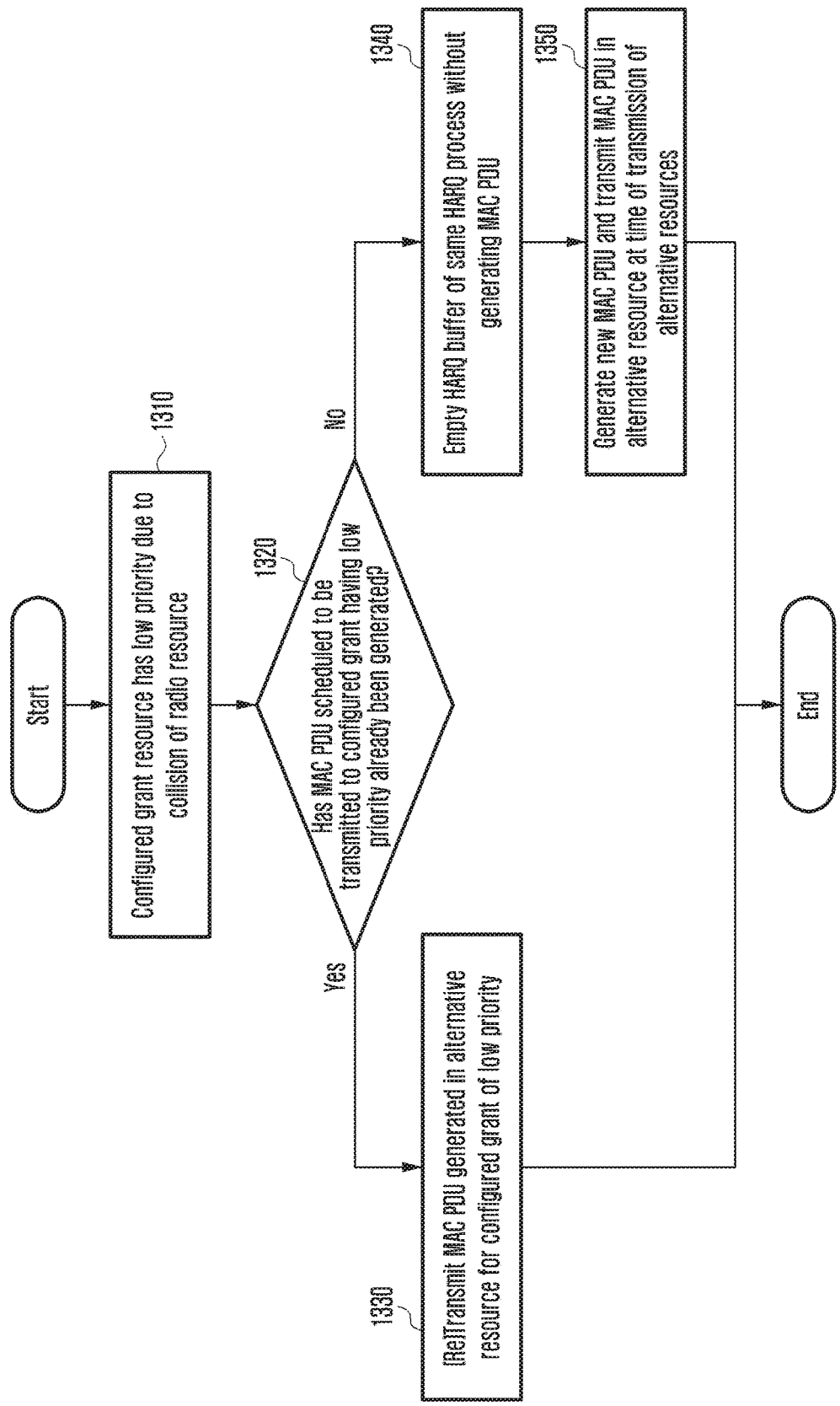
FIG. 13 is a flowchart illustrating alternative resource transmission methods when configured grants overlap according to an embodiment of the disclosure.

FIG. 13 illustrates an operation process for alternative resource transmission when the configured grant overlaps according to an embodiment of the disclosure.

Referring to FIG. 13, as described above, when two or more configured grant resources overlap, the terminal may be indicated to transmit to an alternative resource for a radio resource having a low priority. In addition, even when the configured grant resource and the dynamic grant resource overlap or two or more dynamic grant resources overlap, the terminal may be indicated to transmit to the alternative resource. In addition, if the configured grant or the dynamic grant has a low priority when control information, such as a scheduling request and the configured grant or dynamic grant resource overlap, the terminal may be indicated to transmit to the alternative resource even at this time. According to an embodiment of the disclosure, these alternative resources may be transferred in advance by an RRC configuration or reconfiguration message, or may be transferred in the form of DCI using the PDCCH.

In embodiments of the disclosure, these alternative resources may be retransmission resources of the same hybrid ARQ (HARQ) process for a configured grant or dynamic grant having a lower priority. In the case of a configured grant, resources allocated by configured scheduling radio network temporary identifier RNTI (CS-RNTI) may be alternative resources using these retransmission resources rather than enabling or disabling the type 2 configured grant. The terminal may assume that a configured grant has a lower priority than other resources due to a collision of radio resources in operation 1310. At this time, the terminal may identify whether the media access control protocol data unit (MAC PDU) which is scheduled to be transmitted to the configured grant having a low priority has already been generated or has already been transmitted to the lower physical layer. If the MAC PDU that was scheduled to be transmitted to the configured grant with lower a has already been generated in operation 1320, the terminal may transmit or retransmit the MAC PDU already generated in the alternative resource to the configured grant of the lower priority in operation 1330. Here, the MAC PDU already generated may mean a MAC PDU stored in an HARQ buffer corresponding to the HARQ process. On the other hand, if the MAC PDU which is to be transmitted to the configured grant with a low priority is not already generated in operation 1320, the terminal does not need to generate the corresponding MAC PDU. However, since the MAC PDU previously transmitted may remain in the HARQ buffer of the corresponding HARQ process and the MAC PDU is not the MAC PDU to be transmitted by the terminal at this time, the remaining MAC PDU should be removed. Accordingly, the terminal may empty the HARQ buffer of the same HARQ process without generating the MAC PDU in operation 1340. In this way, the terminal may then identify that the HARQ buffer is empty at the time of transmission of the alternative resource and generate a new MAC PDU to be transmitted. If so, the terminal may transmit the MAC PDU newly generated in the corresponding alternative resource in operation 1350.

FIG. 14 illustrates an operation process for alternative resource transmission when the dynamic grant overlaps according to an embodiment of the disclosure.

Referring to FIG. 14, as described above, when two or more dynamic grant resources overlap, the terminal may be indicated to transmit to an alternative resource for a radio resource having a low priority. In addition, even when the configured grant resource and the dynamic grant resource overlap or two or more dynamic grant resources overlap, the terminal may be indicated to transmit to the alternative resource. In addition, if the configured grant or the dynamic grant has a low priority when control information, such as a scheduling request and the configured grant or dynamic grant resource overlap, the terminal may be indicated to transmit to the alternative resource even at this time. According to an embodiment of the disclosure, these alternative resources may be transferred in advance by an RRC configuration or reconfiguration message, or may be informed in the form of DCI using the PDCCH.

In an embodiment of the disclosure, these alternative resources may be retransmission resources of the same HARQ process for a configured grant or dynamic grant having a lower priority. The terminal may assume that a dynamic grant has a lower priority than other resources (configured grant, dynamic grant, control information, such as scheduling request) due to a collision of radio resources in operation 1410. At this time, the terminal may identify whether the MAC PDU which is scheduled to be transmitted to the dynamic grant having a low priority has already been generated or has already been transmitted to the lower physical layer. If the MAC PDU that was scheduled to be transmitted to the dynamic grant with a lower priority has already been generated in operation 1420, the terminal may transmit or retransmit the MAC PDU already generated in the alternative resource to the dynamic grant of the lower priority in operation 1430. Here, the already generated MAC PDU may mean a MAC PDU stored in an HARQ buffer corresponding to the HARQ process. On the other hand, if the MAC PDU which is to be transmitted to the dynamic grant with the low priority has not already been generated in operation 1420, the terminal does not need to generate the corresponding MAC PDU. However, since the MAC PDU previously transmitted may remain in the HARQ buffer of the corresponding HARQ process and the MAC PDU is not the MAC PDU to be transmitted by the terminal at this time, the remaining MAC PDU should be removed. Accordingly, the terminal may empty the HARQ buffer of the same HARQ process without generating the MAC PDU in operation 1440. In this way, the terminal may then identify that the HARQ buffer is empty at the time of transmission of the alternative resource and generate a new MAC PDU to be transmitted. If so, the terminal may transmit the MAC PDU newly generated in the corresponding alternative resource in operation 1450.

While the disclosure has been described and shown to various embodiments thereof, it will be understood by those skilled in the art that various changes in form and details may be made therein without departing from the spirit and scope of the disclosure as defined by the appended claims and their equivalents.

What is claimed is:

1. A method of a terminal in a wireless communication system, the method comprising:
   identifying whether a dynamic grant is prioritized based on a collision of a resource associated with the dynamic grant;
   identifying whether a media access control (MAC) protocol data unit (PDU) associated with the dynamic grant is generated by an MAC entity after the dynamic grant is allocated; and
   based on the dynamic grant being deprioritized and the MAC PDU not being generated, flushing a buffer.

2. The method of claim 1, wherein the buffer is a hybrid automatic repeat request (HARQ) buffer.

3. The method of claim 1, wherein the buffer is a hybrid automatic repeat request (HARQ) buffer of an HARQ process.

4. The method of claim 1, wherein the identifying of whether the dynamic grant is prioritized further comprises:
- identifying whether the resource associated with the dynamic grant and a resource associated with another uplink grant collide; and
- based on the another uplink grant being a configured grant, identifying that the dynamic grant is a deprioritized uplink grant.

5. The method of claim 4, wherein the another uplink grant is at least one of a configured grant, a dynamic grant, or for control information.

6. A terminal in a wireless communication system, the terminal comprising:
- a transceiver configured to transmit and receive a signal; and
- at least one processor configured to:
  - identify whether a dynamic grant is prioritized based on a collision of a resource associated with the dynamic grant,
  - identify whether a media access control (MAC) protocol data unit (PDU) associated with the dynamic grant is generated by an MAC entity after the dynamic grant is allocated, and
  - control to flush a buffer, in a case that the dynamic grant is deprioritized and the MAC PDU is not generated.

7. The terminal of claim 6, wherein the buffer is a hybrid automatic repeat request (HARQ) buffer.

8. The terminal of claim 6, wherein the buffer is a hybrid automatic repeat request (HARQ) buffer of an HARQ process.

9. The terminal of claim 6, wherein the at least one processor is further configured to:
- identify whether the resource associated with the dynamic grant and a resource associated with another uplink grant collide, and
- identify that the dynamic grant is a deprioritized uplink grant, in case that the another uplink grant is a configured grant.

10. The terminal of claim 9, wherein the another uplink grant is at least one of a configured grant, a dynamic grant, or for control information.

* * * * *